United States Patent
Park et al.

(10) Patent No.: US 9,282,469 B1
(45) Date of Patent: Mar. 8, 2016

(54) INCREASING CINR GAIN IN A NETWORK DEPLOYING BEAM FORMING

(71) Applicant: SPRINT COMMUNICATION COMPANY L.P., Overland Park, KS (US)

(72) Inventors: Sungki Park, Ashburn, VA (US); Brent Scott, Gardner, KS (US); Saied Kazeminejad, Ashburn, VA (US); Brett Christian, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

(21) Appl. No.: 14/017,613

(22) Filed: Sep. 4, 2013

(51) Int. Cl.
  *H04W 16/28* (2009.01)
  *H04W 36/00* (2009.01)
  *H04W 52/24* (2009.01)

(52) U.S. Cl.
  CPC .......... *H04W 16/28* (2013.01); *H04W 36/0083* (2013.01); *H04W 36/0061* (2013.01); *H04W 52/24* (2013.01)

(58) Field of Classification Search
  None
  See application file for complete search history.

(56) References Cited

U.S. PATENT DOCUMENTS

| | | | | |
|---|---|---|---|---|
| 2009/0207822 A1* | 8/2009 | Kim | ...................... | H04W 72/02 370/338 |
| 2010/0002643 A1* | 1/2010 | Han | ...................... | H04B 7/0417 370/329 |
| 2010/0323711 A1* | 12/2010 | Damnjanovic et al. | ........ | 455/450 |
| 2011/0053589 A1* | 3/2011 | Kimura | ................. | H04W 16/10 455/424 |
| 2011/0223928 A1* | 9/2011 | Seo | ................... | H04W 72/1226 455/452.1 |
| 2013/0017855 A1* | 1/2013 | Hui et al. | ....................... | 455/522 |
| 2013/0331136 A1* | 12/2013 | Yang | ...................... | H04B 7/024 455/501 |

* cited by examiner

*Primary Examiner* — Yemane Mesfin
*Assistant Examiner* — Peter Chen

(57) ABSTRACT

A method, system, and medium are provided for increasing carrier-to-interference-and-noise ratio (CINR) gain in a long-term-evolution network deploying beam forming (BF) technologies. Adjacent eNodeBs, each serving a respective user equipment (UE) located at the boundary between the two eNodeBs, communicate BF parameters to each other. Each eNodeB uses the received BF parameters to adjust its DL transmission beam in order to decrease the interference at each of the respective UEs. By adjusting the DL transmission beam to decrease interference, CINR gain at the UEs is correspondingly increased.

18 Claims, 5 Drawing Sheets

INCREASING CINR GAIN IN A NETWORK DEPLOYING BEAM FORMING

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, computer-readable media, methods, and systems, for increasing carrier-to-interference-and-noise ratio (CINR) gain in networks deploying beam forming (BF) technologies. Adjacent eNodeBs, each serving a respective user equipment (UE) located at the boundary between the two eNodeBs, communicate BF parameters to each other. Each eNodeB uses the received BF parameters to adjust its respective DL transmission beam in order to decrease the interference at each of the respective UEs. By adjusting the DL transmission beams to decrease interference, CINR gain at each of the respective UEs is correspondingly increased. The result is a better user experience for the network subscriber.

BRIEF DESCRIPTION OF THE DRAWINGS

Illustrative embodiments of the present invention are described in detail below with reference to the attached drawing figures, and wherein.

DETAILED DESCRIPTION

Figure 1:
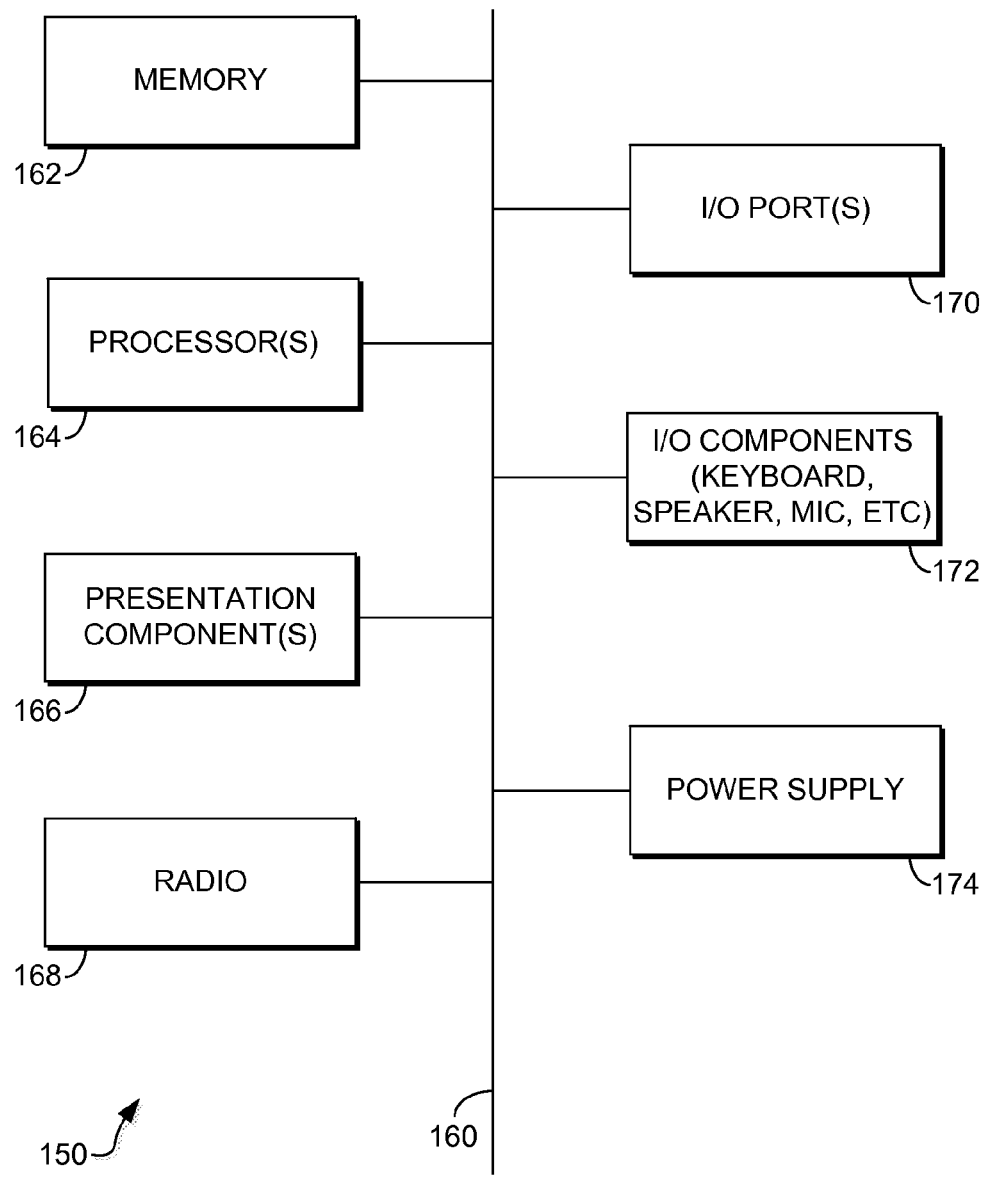
FIG. 1 depicts an exemplary user equipment according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:
BF Beam forming
CA Carrier Aggregation
CDMA Code Division Multiple Access
CINR Carrier-to-Interference-and-Noise Ratio
DL Downlink
eNodeB Evolved Node B
GIS Geographic Information System
2GPP $2^{nd}$ Generation Partnership Project
3GPP $3^{rd}$ Generation Partnership Project
GPRS General Packet Radio Service
GSM Global System for Mobile Communications
LTE Long-Term Evolution
PMI Pre-Coding Metric Indicator
RF Radio-Frequency
RSRP Reference Signal Received Power
SINR Signal-to-Interference-and-Noise-Ratio
SRS Sounding Reference Signal
TDMA Time Division Multiple Access
TM Transmission Mode
UE User Equipment
UERS User Equipment Reference Signal
WCDMA Wideband Code Division Multiple Access Further, various technical terms are used throughout this description. An illustrative resource that fleshes out various aspects of these terms can be found in Newton's Telecom Dictionary, $27^{th}$ Edition (2012).

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for increasing CINR gain in networks deploying BF. Adjacent eNodeBs, each serving a respective UE located at the boundary between the two eNodeBs, communicate BF parameters to each other. Each eNodeB uses the received BF parameters to adjust its DL transmission beam in order to decrease the interference at each of the respective UEs. By adjusting the DL transmission beams to decrease interference, CINR gain at each of the respective UEs is correspondingly increased. The result is a better user experience for the network subscriber.

Accordingly, in a first aspect, a first eNodeB determines a first DL transmission beam to establish a communications link with a first UE; the first DL transmission beam is characterized by a first set of BF parameters. The first set of BF parameters is communicated by the first eNodeB to a neighboring eNodeB. A second set of BF parameters is received by the first eNodeB from the neighboring eNodeB; the second set of BF parameters characterizes a second DL transmission beam used by the neighboring eNodeB to establish a communications link with a second UE. The first eNodeB uses the second set of BF parameters to adjust the first DL transmission beam in order to increase CINR gain at the first UE.

In a second aspect, the first eNodeB determines a first DL transmission beam to establish a communications link with a first UE; the first DL transmission beam is characterized by a first set of BF parameters. The first set of BF parameters is communicated by the first eNodeB to a neighboring eNodeB. A second set of BF parameters is received by the first eNodeB from the neighboring eNodeB; the second set of BF parameters characterizes a second DL transmission beam used by the neighboring eNodeB to establish a communications link with a second UE. The first eNodeB uses the second set of BF parameters to adjust the first DL transmission beam in order to increase CINR gain at the first UE. Likewise, the neighboring eNodeB communicates the second set of BF parameters associated with the second DL transmission beam to the first eNodeB, and receives from the first eNodeB the first set of BF parameters. The neighboring eNodeB adjusts the second DL transmission beam to increase the CINR gain at the second UE based on the first set of BF parameters.

In a third aspect, the first eNodeB determines a first DL transmission beam to establish a communications link with a first UE. The first DL transmission beam is characterized by a first set of BF parameters comprising a UERS, a PMI, a SRS, and weights. The first eNodeB communicates the first set of BF parameters to a neighboring eNodeB using an X2 interface. The first eNodeB receives from the neighboring eNodeB, via the X2 interface, a second set of BF parameters that characterize a second DL transmission beam used by the neighboring eNodeB to establish a communications link with a second UE. The second set of BF parameters comprises at least a UERS, a PMI, a SRS, and weights. The first eNodeB adjusts the phase of the first DL transmission beam to increase the CINR gain at the first UE based on the second set of BF parameters.

Turning now to FIG. 1, a block diagram of an illustrative communications device or UE is provided and is referenced generally by the numeral 150. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

As way of background, specifications for LTE-Advanced provide for, among other things, increased cell capacity and throughput by utilizing multi-antenna techniques such as beam forming (BF). LTE defines several DL transmission modes that support beam forming such as TM7 and TM8; TM7 supports single layer BF, and TM8 supports dual layer BF. At a high level, BF is used by an eNodeB to maximize signal power in the direction of a first UE. Signal power is maximized or optimized by adjusting the phase and amplitude of the DL transmission beam. The phase and amplitude, in turn, are used in the calculation of the BF weights. Thus, with BF, improved reference signal received power (RSRP) is achieved at the first UE. However, to achieve meaningful CINR gain at the first UE, interference due to neighboring eNodeB DL transmission beams needs to be reduced or mitigated. For example, DL transmission beams may have a width of 21 degrees (roughly equivalent to around one-third of a 65 degree sector beam). DL transmission beams of this width from neighboring eNodeBs will likely collide with the given DL transmission beam resulting in no or minimal CINR gain at the first UE.

Figure 2:
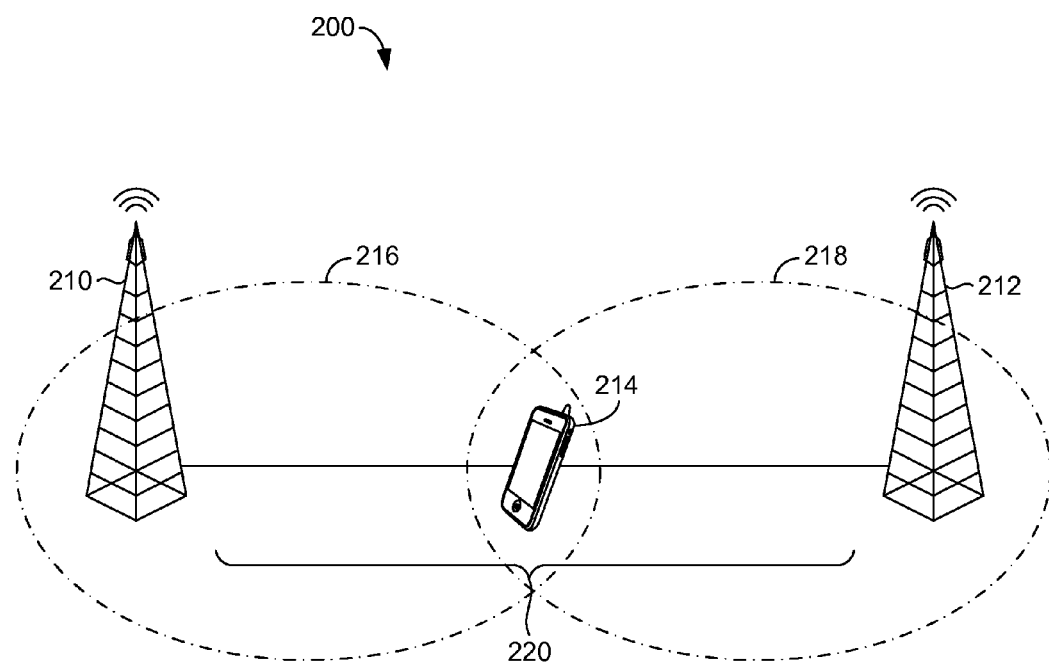
FIG. 2 depicts an exemplary arrangement of adjacent eNodeBs in an LTE network suitable for practicing an embodiment of the technology.

FIG. 2 depicts an exemplary arrangement of neighboring eNodeBs in an LTE network and is referenced generally by the numeral 200. FIG. 2 includes a first eNodeB 210, a neighboring eNodeB 212, and a UE 214 located between the serving boundaries of the first eNodeB 210 and the neighboring eNodeB 212. Although only one UE and two eNodeBs are depicted in FIG. 2, it is contemplated that there may be numerous UEs and eNodeBs within the LTE network. The UE 214 may be the same as the communications device 150 of FIG. 1. The UE 214 may subscribe to voice and data services offered by the LTE network. As such, the UE 214 may be in communication with the network via either the first eNodeB 210 through communications link 216 or the neighboring eNodeB 212 through communications link 218. The communications links 216 and 218 each comprise RF spectrum bandwidth. The UE 210 may communicate with the eNodeBs 210 or 212 via the links 216 or 218 respectively to facilitate attachment of the UE 210 to one of the eNodeBs 210 or 212. Once attached, the UE 210 may also use the links 216 or 218 to send and/or receive voice or data information.

Each of the eNodeBs 210 and 212 includes hardware and bandwidth(s) of a specified frequency. The hardware includes, for example, the actual radio mast or tower, as well as antennas, transceivers, GPS receivers, electrical power sources, digital signal processors, control electronics, and the like that are associated with the radio tower. The RF spectrum bandwidth may comprise one or more RF channels having a DL channel and an associated UL channel. The RF channels are capable of carrying packet-switched technologies such as LTE as well as other technologies such as circuit-switched technologies, although only one type of technology is carried by an RF channel at a time. The first eNodeB 210 and the neighboring eNodeB 212 may communicate with each other over an X2 interface 220. The X2 interface 220 is used to support UE mobility (e.g., handovers) as well as resource management functions. For the purposes of this application, eNodeBs that are located generally within the same geographic area and that are capable of serving the same UE are known as adjacent eNodeBs or neighboring eNodeBs.

Figure 3:
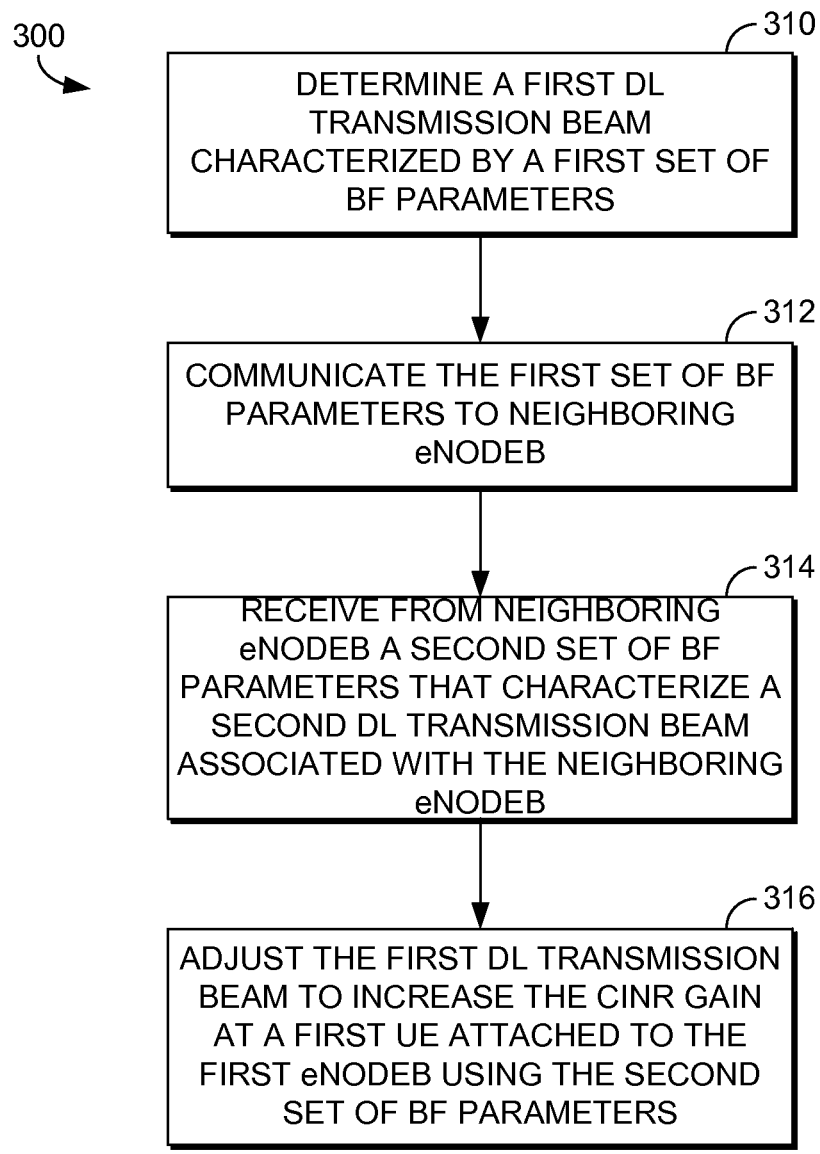
FIG. 3 depicts a flow diagram of an exemplary method of increasing CINR gain in an LTE network deploying beam forming according to an embodiment of the technology.

Turning now to FIG. 3, a flow diagram is depicted illustrating an exemplary method 300 of increasing CINR gain in an LTE network deploying BF. The network includes at least a first eNodeB serving a first UE and a neighboring or adjacent eNodeB serving a second UE. The first and second UEs may be in close geographic proximity to each other such that there is a high likelihood of collision or interference between the respective transmission beams serving the UEs. The UEs may be the same as the communications device 150 of FIG. 1 or the UE 214 of FIG. 2. As well, the first eNodeB may correspond to the first eNodeB 210 of FIG. 2, and the neighboring eNode B may correspond to the neighboring eNodeB 212 of FIG. 2.

At a step 310, the first eNodeB determines or establishes a first DL transmission beam in order to communicate with the first UE. The first DL transmission beam is characterized by a first set of BF parameters. BF parameters include at least a UE reference signal (UERS), a pre-coding matrix indicator (PMI), a sounding reference signal (SRS), beam weights, and an amplitude and phase of the transmission beam. The UERS, as defined by 3GPP specifications, is a UE-specific reference signal utilized by beam forming UEs to demodulate data traffic. The PMI is the indicator of the precoding matrix selected by, for example, the first UE based on DL channel conditions. Once selected, the first UE communicates the PMI to the first eNodeB so that the first eNodeB is aware of the DL channel conditions. In turn, the first eNodeB utilizes the PMI for antenna port weighting by which the phase and amplitude of the transmission beam are determined. The first eNodeB may use the PMI or the SRS for antenna weighting depending on the transmission mode used for BF.

At a step 312, the first eNodeB communicates the first set of BF parameters to the neighboring eNodeB. As explained above, a neighboring eNodeB may be defined as an eNodeB that is in geographic proximity to the first eNodeB and is capable of serving a UE located between the first UE and the neighboring UE. The communication between the first eNodeB and the neighboring eNodeB may occur over a pre-existing X2 interface.

At a step 314, the first eNodeB receives a second set of BF parameters from the neighboring eNodeB. The second set of BF parameters characterizes a second DL transmission beam used by the neighboring eNodeB to establish a communications link with the second UE. The second set of BF parameters includes a UERS, a PMI, a SRS, weights associated with the second DL transmission beam, and a phase and amplitude associated with the second DL transmission beam.

At a step 316, the first eNodeB adjusts the first DL transmission beam based on the second set of BF parameters received from the neighboring eNodeB to increase the CINR gain at the first UE. In one aspect, the first eNode uses the second set of BF parameters to determine a new phase for the first DL transmission beam. By adjusting the phase of the first DL transmission beam, interference between the first DL transmission beam and the second DL transmission beam is reduced and CINR gain is correspondingly increased at the first UE. For example, CINR can be mathematically expressed by the following formula:

$$CINR = \frac{S}{I+N}$$

Where S is signal strength, I is interference, and N is noise. Thus, if I is decreased by adjusting the phase of the first DL transmission beam, then CINR gain at the first UE is correspondingly increased.

Figure 4:
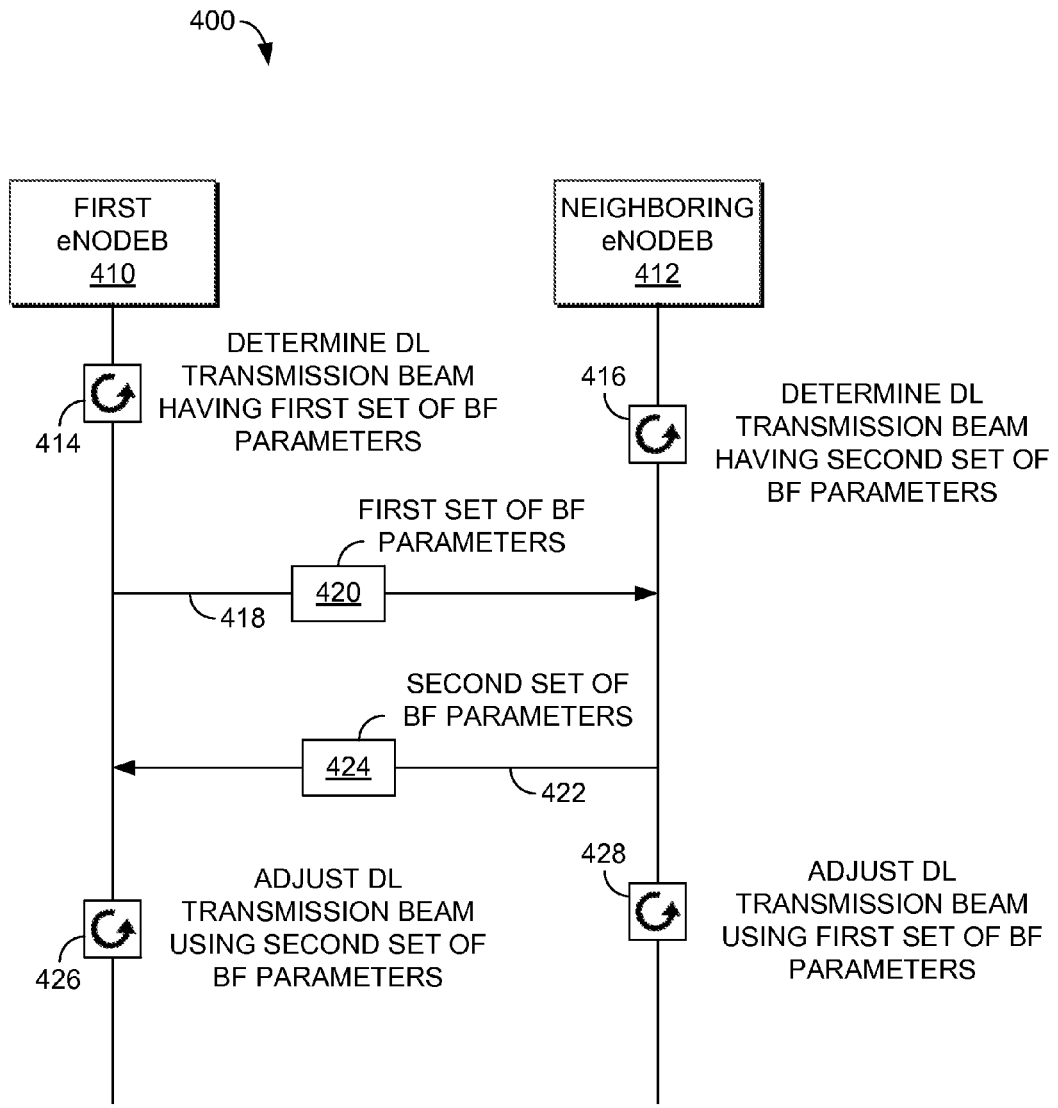
FIG. 4 depicts a process-flow diagram illustrating an exemplary method of increasing CINR gain in an LTE network deploying beam forming according to an embodiment of the technology.

Turning now to FIG. 4, FIG. 4 depicts a process-flow diagram illustrating a method of increasing CINR gain at both a first UE and a second UE in an LTE network deploying BF and is referenced generally by the numeral 400. The LTE network includes a first eNodeB 410 serving a first UE; the first eNodeB 410 may be the same as the first eNodeB 210 of FIG. 2. The LTE network also includes a neighboring eNodeB 412 serving a second UE; the neighboring eNodeB 412 may be the same as the neighboring eNodeB 212 of FIG. 2. The first eNodeB 410 and the neighboring eNodeB 412 are in geographic proximity to each other and are capable of serving the same UE. Further, the first eNodeB 410 and the neighboring eNodeB 412 are owned by the same wireless-telecommunications-carrier.

At a step 414, the first eNodeB 410 determines a first DL transmission beam to communicate with the first UE. The first DL transmission beam is characterized by a first set of BF parameters that include, for example, a UERS, a PMI, an SRS, weights, and a phase and amplitude of the beam. Additional BF parameters beyond these parameters are contemplated as being included within the scope of the invention. At a step 416, the neighboring eNodeB 412 determines a second DL transmission beam to establish a communications link with the second UE. The second DL transmission beam is characterized by a second set of BF parameters that may include a UERS, a PMI, an SRS, weights, and a phase and amplitude of the second DL transmission beam.

At a step 418, the first eNodeB 410 communicates the first set of BF parameters 420 to the neighboring eNodeB 412. Communication occurs over an existing X2 interface although other ways of communicating the BF parameters 420 are contemplated as being within the scope of the invention. At a step 422, the neighboring eNodeB 412 communicates the second set of BF parameters 424 to the first eNodeB 410. Again, this occurs over an existing X2 interface although other methods of communication between eNodeBs are contemplated as being within the scope of the invention.

At a step 426, the first eNodeB 410 adjusts the first DL transmission beam based on the second set of BF parameters 424 to decrease interference, and increase CINR gain, at the first UE. In one aspect, the phase of the first DL transmission beam may be adjusted to reduce interference at the first UE while keeping the amplitude associated with the first DL transmission beam the same. In a second aspect, both the phase and the amplitude of the first DL transmission beam may be adjusted to reduce interference at the first UE. Thus, once the phase has been adjusted to decrease interference, the amplitude of the first DL transmission beam may be increased to increase the RSRP at the first UE. Any and all such aspects, and any variation thereof, are contemplated as being within the scope of the invention. Likewise, at a step 428, the neighboring eNodeB 412 adjusts the second DL transmission beam based on the first set of BF parameters 420 to decrease interference, and increase CINR gain, at the second UE Like above, the second DL transmission beam may be adjusted by adjusting the phase associated with the second DL transmission beam and keeping the amplitude the same. Alternatively, the phase may be adjusted to reduce interference and increase CINR gain, and the amplitude may be increased to increase the RSRP at the second UE. Any and all such aspects, and any variation thereof, are contemplated as being within the scope of the invention.

Figure 5:
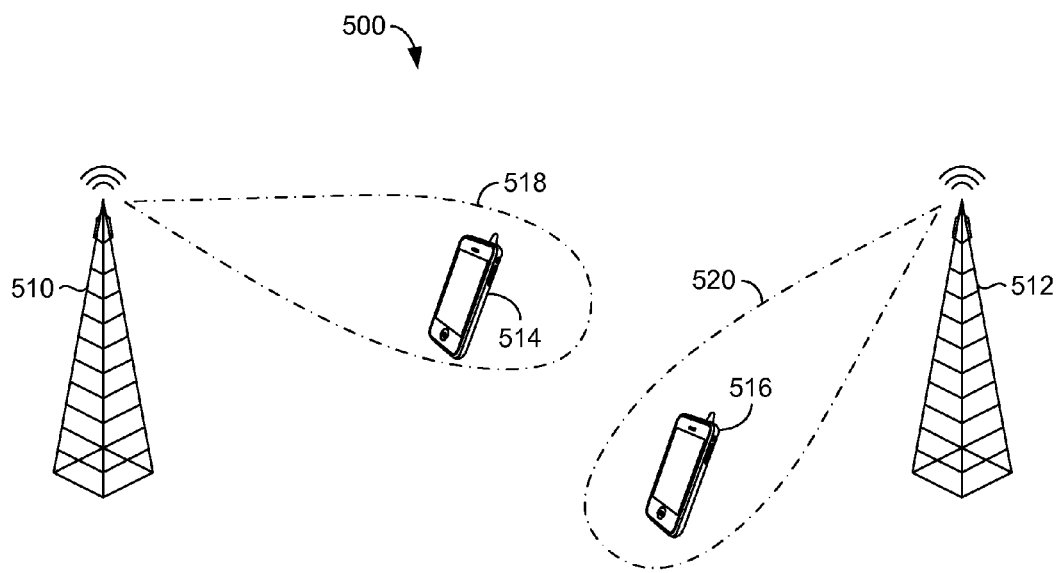
FIG. 5 depicts adjacent eNodeBs minimizing interference between DL transmission beams based on received beam forming parameters according to an embodiment of the technology.

FIG. 5 depicts adjacent eNodeBs minimizing interference between DL transmission beams based on the exchange of BF parameters and is referenced generally by the numeral 500. FIG. 5 includes a first eNodeB 510 transmitting a first DL transmission beam 518 to a first UE 514. FIG. 5 also includes a second eNodeB 512 transmitting a second DL transmission beam 520 to a second UE 516. As seen in FIG. 5, the beams 518 and 520 are spatially separated by adjusting, for example, the phase of each beam based on the communication of BF parameters between the first eNodeB 510 and the second eNodeB 512. By separating the beams, interference at each of the UEs 514 and 516 is reduced and CINR gain is correspondingly increased.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more computer-readable media having computer-executable instructions embodied thereon that, when executed, perform a method of increasing carrier-to-interference-and-noise ratio (CINR) gain in a long-term-evolution (LTE) network deploying beam forming (BF), the LTE network having at least a first eNodeB serving a first user equipment (UE) and a neighboring eNodeB serving a second UE, wherein both the first eNodeB and the neighboring eNodeB utilize BF, the method comprising:

at the first eNodeB
determining a first downlink (DL) transmission beam to establish a communications link with the first UE, the first DL transmission beam characterized by a first set of BF parameters comprising a UE reference signal (UERS), a pre-coding metric indicator (PMI), a sounding reference signal (SRS), weights associated with the first DL transmission beam, a phase associated with the first DL transmission beam, and an amplitude associated with the first DL transmission beam;
communicating the first set of BF parameters to the neighboring eNodeB;
receiving from the neighboring eNodeB a second set of BF parameters that characterize a second DL transmission beam used by the neighboring eNodeB to establish a communications link with the second UE, the second set of BF parameters comprising a UE reference signal (UERS), a pre-coding metric indicator (PMI), a sounding reference signal (SRS), weights associated with the second DL transmission beam, a phase associated with the second DL transmission beam, and an amplitude associated with the second DL transmission beam; and
adjusting the first DL transmission beam to increase the CINR gain at the first UE based on the second set of BF parameters received from the neighboring eNodeB.

2. The media of claim 1, wherein at least the PMI and the SRS are communicated from the first UE to the first eNodeB.

3. The media of claim 1, wherein the first eNodeB communicates the first set of BF parameters to the neighboring eNodeB over an X2 interface.

4. The media of claim 1, wherein the second set of BF parameters is received from the neighboring eNodeB over an X2 interface.

5. The media of claim 1, wherein at least the PMI and the SRS are communicated from the second UE to the neighboring eNodeB.

6. The media of claim 1, wherein adjusting the first DL transmission beam to increase the CINR gain at the first UE comprises adjusting the phase of the first DL transmission beam.

7. The media of claim 6, wherein the CINR gain is increased by decreasing the interference at the first UE.

8. A computerized method carried out by a server having at least one processor for performing a method of increasing carrier-to-interference-and-noise ratio (CINR) gain in a long-term-evolution (LTE) network deploying beam forming (BF), the LTE network having at least a first eNodeB serving a first user equipment (UE) and a neighboring eNodeB serving a second UE, wherein both the first eNodeB and the neighboring eNodeB utilize BF, the method comprising:

at the first eNodeB:
determining, using the at least the one processor, a first downlink (DL) transmission beam to establish a communications link with the first UE, the first DL transmission beam characterized by a first set of BF parameters comprising a UE reference signal (UERS), a pre-coding metric indicator (PMI), a sounding reference signal (SRS), weights associated with the first DL transmission beam, a phase associated with the first DL transmission beam, and an amplitude associated with the first DL transmission beam;
communicating the first set of BF parameters to the neighboring eNodeB;
receiving from the neighboring eNodeB a second set of BF parameters characterizing a second DL transmission beam used by the neighboring eNodeB to establish a communications link with the second UE, the second set of BF parameters comprising a UE reference signal (UERS), a pre-coding metric indicator (PMI), a sounding reference signal (SRS), weights associated with the second DL transmission beam, a phase associated with the second DL transmission beam, and an amplitude associated with the second DL transmission beam; and
adjusting, using the at least one processor, the first DL transmission beam to increase the CINR gain at the first UE based on the second set of BF parameters received from the neighboring eNodeB; at the neighboring eNodeB:
communicating the second set of BF parameters associated with the second DL transmission beam to the first eNodeB;
receiving from the first eNodeB the first set of BF parameters; and
adjusting, using the at least the one processor, the second DL transmission beam to increase the CINR gain at the second UE based on the first set of BF parameters received from the first eNodeB.

9. The computerized method of claim 8, wherein the first eNodeB and the neighboring eNodeB are both owned by the same wireless-telecommunications-network.

10. The computerized method of claim 8, wherein the first eNodeB and the neighboring eNodeB are geographically adjacent to each other.

11. The computerized method of claim 8, wherein adjusting the first DL transmission beam comprises adjusting a phase associated with the first DL transmission beam while keeping an amplitude associated with the first DL transmission beam the same.

12. The computerized method of claim 8, wherein adjusting the first DL transmission beam comprises adjusting a phase associated with the first DL transmission beam and increasing an amplitude associated with the first DL transmission beam.

13. The computerized method of claim 8, wherein adjusting the second DL transmission beam comprises adjusting a phase associated with the second DL transmission beam while keeping an amplitude associated with the first DL transmission beam the same.

14. The computerized method of claim 8, wherein adjusting the second DL transmission beam comprises adjusting a phase associated with the second DL transmission beam and increasing an amplitude associated with the second DL transmission beam.

15. The computerized method of claim 8, wherein the CINR gain at the first UE is increased by decreasing the interference at the first UE.

16. The computerized method of claim 10, wherein the CINR gain at the second UE is increased by decreasing the interference at the second UE.

17. The computerized method of claim 8, wherein the first eNodeB and the second eNodeB communicate over an X2 interface.

18. A system for increasing carrier-to-interference-and-noise ratio (CINR) gain in a long-term-evolution (LTE) network deploying beam forming (BF), the LTE network having at least a first eNodeB serving a first user equipment (UE) and a neighboring eNodeB serving a second UE, wherein both the first eNodeB and the neighboring eNodeB utilize BF, the system comprising:

a computing device associated with the first eNodeB having one or more processors and one or more computer-readable media; and
a data store coupled with the first eNodeB,
wherein the first eNodeB:
    determines a first downlink (DL) transmission beam to establish a communications link with the first UE, the first DL transmission beam characterized by a first set of BF parameters comprising at least a UE reference signal (UERS), a pre-coding metric indicator (PMI), a sounding reference signal (SRS), weights associated with the first DL transmission beam, a phase associated with the first DL transmission beam, and an amplitude associated with the first DL transmission beam;
    communicates the first set of BF parameters to the neighboring eNodeB utilizing an X2 interface;
    receives from the neighboring eNodeB, via the X2 interface, a second set of BF parameters that characterize a second DL transmission beam used by the neighboring eNodeB to establish a communications link with the second UE, the second set of BF parameters comprising at least a UERS, a PMI, a SRS, weights associated with the second DL transmission beam, a phase associated with the second DL transmission beam, and an amplitude associated with the second DL transmission beam; and
    adjusts at least the phase of the first DL transmission beam to increase the CINR gain at the first UE based on the second set of BF parameters received from the neighboring eNodeB.

* * * * *